United States Patent [19]

Martinez

[11] 4,026,373
[45] May 31, 1977

[54] HILL PLOWER

[76] Inventor: Eleuterio Ruiz Martinez, Luis Celis Perez St. Num. 158, Fajardo, P.R. 00648

[22] Filed: Feb. 27, 1976

[21] Appl. No.: 662,227

[52] U.S. Cl. .............................. 180/9.22; 172/369; 180/19 R
[51] Int. Cl.² .................. B62D 37/02; B62D 55/00
[58] Field of Search ................ 172/41, 42, 43, 258, 172/369, 292, 360; 180/9.22, 9.44, 9.64, 9.2, 9.4, 19 R; 239/212

[56] References Cited

UNITED STATES PATENTS

| | | | |
|---|---|---|---|
| 1,553,919 | 9/1925 | Smith | 172/258 |
| 1,966,783 | 7/1934 | Balaam | 239/212 |
| 2,046,560 | 7/1936 | Johnson | 180/9.22 |
| 2,238,346 | 4/1941 | Sorensen | 180/9.4 X |
| 2,655,957 | 10/1953 | Lagant | 172/41 |
| 3,009,646 | 11/1961 | Purtell | 180/9.64 |

*Primary Examiner*—Richard J. Johnson
*Attorney, Agent, or Firm*—Burns, Doane, Swecker & Mathis

[57] ABSTRACT

A pedestrian controlled tractor particularly suitable for use in working farmland where the ground surface is rough and hilly. The tractor in its preferred form has a relatively narrow endless track driving means and is provided with tubular members directed outwardly from its sides at an angle above the horizontal and also in a substantially horizntal direction. When the tractor is driven by its motor to pull a plow or like implement, a second operator walking along the side of the tractor can support it against lateral tilting or falling by means of a pipe, rod or the like member extending into the one of the tubular members that is disposed in the most suitable direction to permit maximum control.

2 Claims, 2 Drawing Figures

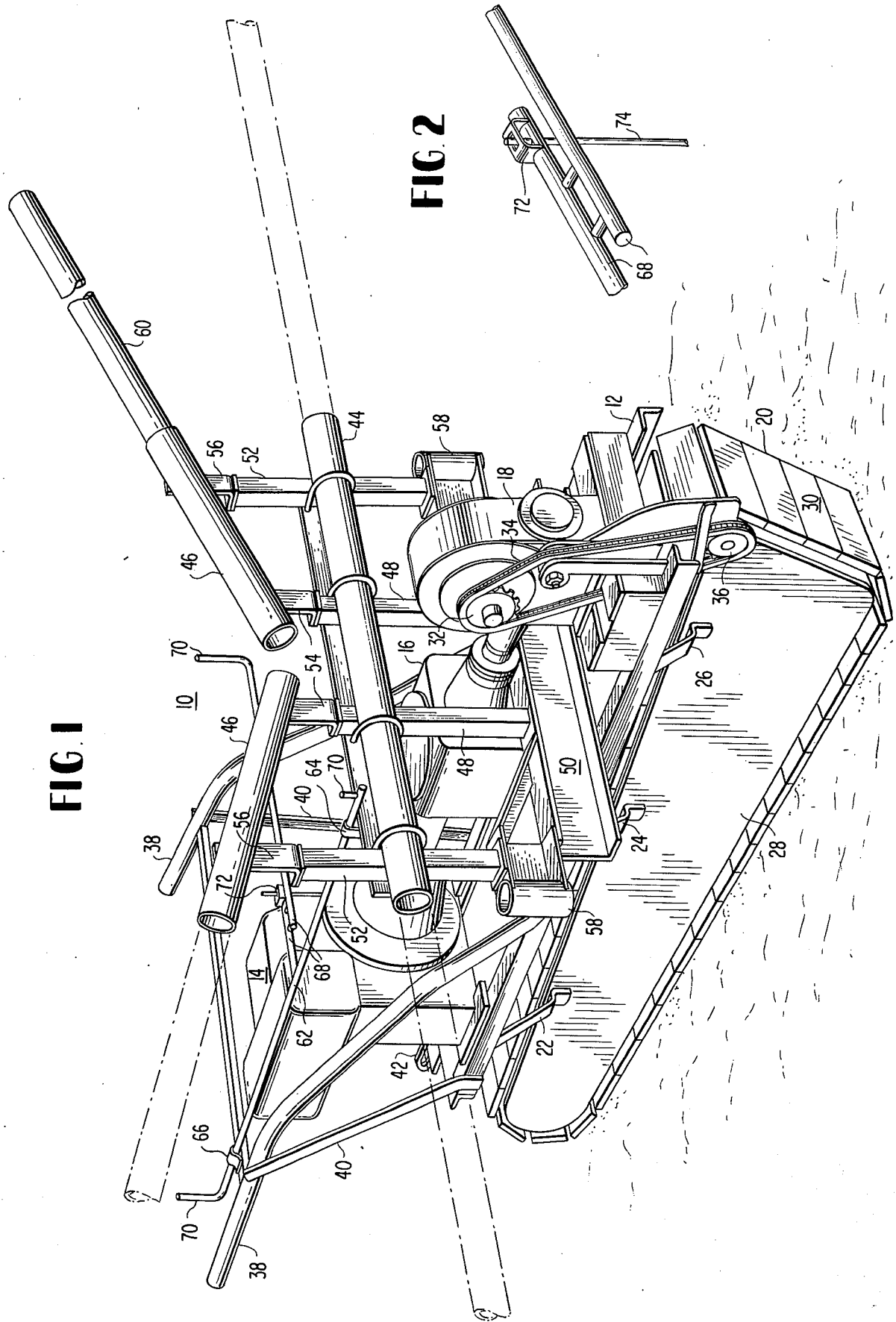

HILL PLOWER

BACKGROUND OF THE INVENTION

This invention relates to pedestrian-controlled, motor-driven traction equipment for use where the ground is hilly, rough or uneven.

Under certain conditions, particularly where hilly areas are to be farmed, it is difficult to work the earth with conventional tractors. In such conditions, conventional three- or four-wheeled tractors are highly susceptible to overturning when used for plowing and the like. Also, such tractors are uneconomical for use on relatively small farms. Lighter weight pedestrian controlled traction devices are difficult if not impossible to hold against tilting over on the side, particularly when plowing or the like along a sidehill direction.

One object of the present invention is to provide a simple and efficient pedestrian controlled tractor which is particularly suitable for use over hilly ground.

Another object of the invention is to provide a pedestrian controlled tractor with relatively narrow traction means that is particularly useful on uneven and hilly terrain and includes means thereon directed sidewardly so that an extension member such as a pipe can be engaged therewith in a readily detachable manner to enable an operator walking beside the tractor to support it against tilting or falling, especially when the tractor is employed on a sidehill slope.

A further object of the invention is to provide a pedestrian controlled tractor with an outwardly directed side member or members which do not greatly increase the width of the tractor when it is handled by an operator grasping rear handles thereon and yet is suitable for ready engagement with an extension member that extends an appreciable distance outboard of the tractor to afford substantial leverage to an operator beside the tractor to permit stabilizing it when pulling a plow, even on sidehill slopes or rough terrain.

DESCRIPTION OF THE DRAWINGS

These and other objects and advantages of the present invention will be apparent from the claims and from the followng detailed description when read in conjunction with the appended drawings in which:

FIG. 1 is a perspective view of a pedestrian operated tractor in accordance with the invention, and FIG. 2 is an enlarged perspective view of a portion of a device for controlling the motive means for the tractor.

DESCRIPTION OF PREFERRED EMBODIMENT

Referring to FIG. 1 of the drawings, an embodiment of a traction device in accordance with my invention is generally designated 10. The device includes a frame structure 12 supporting thereon motive means in the form of a motor 14, a multi-speed transmission 16 and a speed reducer or transmission device 18. The motor 14 may be an internal combustion gasoline engine. The transmission 16 may be a commercially available four speed type and may include a reverse gear. The transmission device 18 may be a commercially available apparatus for reducing speed and increasing power or torque. Universal joints of a common type are provided in the drive connections between the motor 14 and transmission 16 and between transmission 16 and the power transmission 18, respectively.

A drive or traction mechanism 20 is secured to the underside of the frame 12 means including brackets 22, 24 and 26 engaging a support panel 28. Shock absorbing means may be provided at the front and rear of the frame to protect the tractor from damage by rough terrain but they can be omitted if desired. The traction mechanism is shown in the form of an endless belt or track 30 driven from output gear 32 of power transmission 18 through a driven chain 34 and gear 36. The belt or track 30 may be located centrally of the frame 12 and thereby under the center of gravity of the frame and the motive means 14, 16, and 18. The track is preferably relatively long and narrow. Thus, it may be about the same length as, but substantially narrower than, the frame. For example, in a relatively small, lightweight tractor, the track may be as little as about 6½ inches wide and long enough to provide traction with the ground over as much as five feet or more. A narrow width minimizes any tendency of the track to cause the tractor to tilt when it is moving on a side hill with a steep incline. Making the belt or track relatively long results in good traction and longitudinal stability.

A pair of arms or handles 38 are secured at the rear of the frame 12 by welding to the frame at their front ends (not shown) and by members 40 which may be welded to both the handles and the frame. Hitches, one of which is shown at 42, are secured to the rear of frame 12 for hitching an earth working implement, such as a plow, or some other load, thereto in a conventional manner, as by means of a chain or the like. Optionally, the tractor may push a plow or other implement connected to the front end. These arms 38 facilitate handling the tractor when it is at rest.

In accordance with the invention, the tractor is also equipped with means for stabilizing it when it is in operation pulling a plow or the like, and such means function satisfactorily even on rough or hilly ground. Thus, I provide tubular members 44 and 46 extending in an outward direction from the sides of the platform 12. The tubular member 44 may be disposed in a substantially horizontal direction transversely of the frame with openings at both ends. One of a pair of the tubular members 46 extends upwardly and outwardly of each side of the frame. The member 44 is secured to the frame through structural members or tubes 48 which, in turn, are secured to a beam 50 on the frame. The structural members 48 along with additional members 52 support the tubular members 46 through brackets 54 and 56, respectively. Substantially vertically oriented tubular sections 58 are secured at the two ends of beam 50. Preferably, the tubular members, supporting members, beam, tubular sections and frame are secured together as described by welding to provide maximum strength, although other suitable means of attachment may be used.

An extension or stabilizing member 60 is provided for selective insertion into one of the tubular members 46, as shown in the drawing, or into either end of the horizontal tubular member 44. This extension member 60 is preferably a metallic pipe of relatively light weight, although it may be in the form of a rod or the like.

With the pipe 60 inserted into one of the tubular members, an operator grasping the end of the pipe can apply substantial leverage to the tractor 10 as it traverses hilly or rough ground while a second operator handles a plow or similar implement being propelled. If the tractor is making a side hill traverse on a steep slope, the operator can usually exercise greatest control with the pipe in an upwardly extending tubular member on the uphill side. Where a lesser slope is involved or unevenness of the ground presents the primary obstacle to maintaining the tractor upright, the pipe 60 may most satisfactorily be inserted in the appropriate end of the horizontal tubular member 44.

It will be seen that the major extent of the tubular members 44 and 46 may be inboard of the sides of the tractor as will appear from the drawings. The width of the tractor thus is not greatly increased by these tubular members when the tractor is operated on level ground by an operator grasping the rear handles 38. Also, the overall width is not so great as to cause inconvenience in storage. Nevertheless, the pipe member 60 can be readily inserted into an appropriate tubular member to provide very substantial leverage where the rear handles do not permit satisfactory control of the tractor's stability.

The tractor is also provided with a drive control member for the motive means. This is shown as of T-shape with a longitudinal rod 62 mounted on one side of the tractor on front and rear members by straps 64 and 66, respectively, and a center arm made up of interconnected rod portions 68, 68 extending transversely across the tractor. Rod 62 is free to move longitudinally in straps 64 and 66, and each end of the T is bent to provide handle means 70 by which such movement can be controlled by an operator on either side of the tractor.

FIG. 2 shows a member 72 on rod 68 providing therewith a generally vertical guide for a rod 74. Rod 74 extends downwardly for engagement with an operative element of the motive means, i.e., clutch, motor or transmission, whereby such element may be controlled by longitudinal movement of the drive control member.

In operation, the speed at which the tractor is driven from the motor 14 is determined by appropriate adjustment of the transmission 16. The endless belt or track 30 of the drive mechanism 20 being relatively long as previously indicated, it provides excellent tractive engagement with the earth and good longitudinal balance. Even though this feature may somewhat reduce the control of lateral balance which the rear handles 38 permit, the insertion of the pipe 60 into one of the support members 44 or 46 permits convenient lateral stabilization of the tractor. The tractor may be parked by resting it on a pipe 60 disposed in one of the tubular members 44 or the pipe or some other suitable object may be extended through one of the tubular sections 58 in frictional engagement therewith.

The construction involving the tubular members 44 and 46, and the pipe 60, may be of lightweight metal, making it possible to construct a tractor in accordance with the invention with a weight of as low as about 660 pounds. Such a tractor can be capable of pulling a medium sized plow cutting earth six to eight inches in depth and eight to ten inches in width. Made of strong, rigid steel and employed with a pipe or rod in a tubular side member, the tractor is capable of operating efficiently on rough terrain on inclines up to 45 degrees or more on ground overlaid with stones and brush and including bumps and potholes.

It will be apparent from the above description that the specific construction and number of the tubular members 44 ad 46 for receiving supporting extension means 60 may be varied from that shown in the drawings. For example, additional tubular side members similar to those shown may be provided making different angles with the frame 12. Other modifications may also be apparent from the description.

The present embodiment is therefore to be considered in all respects as illustrative and not restrictive, the scope of the invention being indicated by the appended claims rather than the foregoing description, and all changes which come within the meaning and range of equivalency of the claims are intended to be embraced thereby.

What is claimed is:

1. A pedestrian type farm tractor for pulling a plow over rough or hilly terrain comprising:
    a frame,
    a longitudinally extending traction belt secured to said frame for propelling it in a longitudinal direction,
    said belt having a width substantially less than the width of said frame and an effective length longitudinally of the frame of substantially the same order of magnitude as said frame,
    motive means on said frame for driving said traction belt,
    means at the rear of said frame for engagement with means to pull a plow.
    attaching means extending transversely outwardly and upwardly at each side of said frame for releasably engaging a longitudinal member,
    an elongated extension member releasably engaged at one end to said attaching means on one side of said frame to extend outwardly and upwardly to permit an operator to grip the other end thereof to apply a vertical stabilizing force to the tractor while it is pulling a plow over rough or hilly terrain.

2. A tractor as recited in claim 1, wherein said attaching means comprises a tubular member extending outwardly and upwardly from each side of said frame, the inner end of said extension member extends into the tubular member on one side of said frame, and a pair of transversely spaced support arms are provided at the rear of said frame for engagement by an operator to apply a stabilizing force to the tractor when it is moving over substantially level terrain.

* * * * *